United States Patent [19]

Abbadessa et al.

[11] Patent Number: 6,092,801
[45] Date of Patent: Jul. 25, 2000

[54] MAILROOM CONVEYOR SYSTEM WITH AN ELECTRIC LINEAR DEVICE

[75] Inventors: Stephan Edward Abbadessa; Roger Robert Belanger, both of Dover, N.H.; Michael Krüger, Edingen—Neckarhausen; Hans-Jörg Laubscher, Frankenthal, both of Germany

[73] Assignee: Heidelberger Druckmaschinen AG, Heidelberg, Germany

[21] Appl. No.: 08/970,582

[22] Filed: Nov. 14, 1997

Related U.S. Application Data

[63] Continuation-in-part of application No. PCT/EP97/02750, May 28, 1997.

[30] Foreign Application Priority Data

May 29, 1996 [DE] Germany ............................ 196 21 507

[51] Int. Cl.$^7$ .................................................. B65H 29/04
[52] U.S. Cl. ........................ 271/204; 271/203; 271/270; 198/805
[58] Field of Search ................................... 271/202, 203, 271/204, 206, 216, 151, 270; 198/462.2, 805

[56] References Cited

U.S. PATENT DOCUMENTS

| | | | |
|---|---|---|---|
| 4,007,824 | 2/1977 | Reist ..................................... | 198/462.2 |
| 4,081,723 | 3/1978 | Vetter et al. ........................ | 271/204 X |
| 4,201,286 | 5/1980 | Meier ................................... | 271/202 X |
| 4,566,687 | 1/1986 | Faltin ...................................... | 271/202 |
| 4,629,175 | 12/1986 | Fischer .................................. | 271/202 |
| 4,736,941 | 4/1988 | Petersen ............................. | 271/202 X |
| 5,047,676 | 9/1991 | Ichikawa . | |
| 5,062,340 | 11/1991 | Greven .................................. | 271/84 X |
| 5,249,791 | 10/1993 | Belanger et al. . | |
| 5,452,886 | 9/1995 | Cote et al. ............................. | 271/270 |
| 5,560,599 | 10/1996 | Curley et al. ......................... | 271/270 |
| 5,582,400 | 12/1996 | Seydel ................................ | 271/204 X |
| 5,794,929 | 8/1998 | Curley et al. ......................... | 271/270 |
| 5,819,663 | 10/1998 | Klaas et al. ......................... | 271/202 X |
| 5,855,153 | 1/1999 | Cote et al. ................................. | 83/23 |

FOREIGN PATENT DOCUMENTS

| | | |
|---|---|---|
| 0 544 088A | 10/1992 | European Pat. Off. . |
| 0 574 703A1 | 5/1993 | European Pat. Off. . |
| 0 638 503A1 | 6/1994 | European Pat. Off. . |
| 25 01 963 | 12/1975 | Germany . |

*Primary Examiner*—Christopher P. Ellis
*Assistant Examiner*—Patrick Mackey
*Attorney, Agent, or Firm*—Burns, Doane, Swecker & Mathis, L.L.P.

[57] ABSTRACT

A mailroom conveyor system for transporting and handling a stream of printed and folded signatures supplied by high speed tapes of a folding apparatus of a printing press. The system includes a plurality of grippers, a rail system for guiding the grippers, an electric linear drive system for individually driving the grippers in the rail system, and a control system coupled to the electric linear drive system for individually controlling the movement of the grippers in the rail system.

23 Claims, 5 Drawing Sheets

MAILROOM CONVEYOR SYSTEM WITH AN ELECTRIC LINEAR DEVICE

CROSS-REFERENCES TO RELATED APPLICATIONS

The present application is a continuation-in-part of PCT Application No. PCT/EP97/02750 filed May 28, 1997 in the European Patent Office and designating the United States pursuant to 35 U.S.C. §§ 363 and 365(c), the disclosure of which is thereby incorporated by reference in its entirety, and which derives the priority of German Patent Application No. 196 21 507.2 filed May 29, 1996.

FIELD OF THE INVENTION

The invention is related to a mailroom conveyor system with an electric linear drive for transporting folded signatures in a mailroom subsequent to a production line such as, for example, a web-fed rotary printing press or the like. In particular, the invention relates to a conveyor system in which the grippers are individually driven by an electric linear drive.

BACKGROUND OF THE INVENTION

In the production process of high quality print materials, such as magazines, newspapers or other periodicals, a stream of cut and folded signatures is transported from a cutting and folding section of a production line to a mailroom section, such as a bindery or a collator, for further processing. The transportation of the signatures from the folding section to the mailroom is usually performed by known stackers, bundlers, loggers, or roll devices after they have been folded and cut off a running web in the folding section. As the traveling speed of the signatures coming out of the folding section cutter is too high for direct further processing, the signatures have to be decelerated to form a shingled stream of signatures, before entering one of the aforementioned storage systems.

From U.S. Pat. No. 5,452,886 it is known to use deceleration drums having discontinuously rotating gripper arms which grip the leading edge of the signatures transported on a high speed tape, lift the signatures off the high speed tape, decelerate them and place them as a shingled stream on a conveyor belt running with a slower speed. Owing to the rotational and discontinuous movement of the gripper arms, the signatures slowed down by the apparatus described in U.S. Pat. No. 5,452,886 are subject to high centrifugal forces applying additional stress to the signatures.

From EP Patent Document No. 0 574 703 A1 it is further known to use a pair of rotating fan blades having pockets to which the signatures are directly fed by high speed tapes, in order to decelerate the signatures and arrange them as a shingled stream of signatures on a conveyor belt moving below the fan blades with a slower speed. Due to the principle of decelerating the signatures by feeding them into the fan blade pockets, the signatures are subject to high stress, because the kinetic energy of the signature is at least partially absorbed by the signature itself.

OBJECTS AND SUMMARY OF THE INVENTION

Having outlined the state of the art and its attendant disadvantages, it is accordingly an object of the present invention, to provide for a mailroom conveyor system which allows for a direct and precise transfer of signatures from a folding section of a printing press to a subsequent mailroom section for further processing, such as binding, stacking, sorting or the like.

Moreover, it is a further object of the present invention, to provide for a conveyor system which allows for a smooth and controllable deceleration of signatures exiting a folding section of a printing press.

According to a first object of the invention, a gripper conveyor system for transporting and handling a stream of signatures in a mailroom comprises a plurality of grippers, a rail system for guiding the plurality of grippers, an electric linear drive system for individually driving the grippers in said rail system and a control system connected to the electric linear drive system for controlling the movement of the plurality of grippers in the rail system.

According to another embodiment of the invention, the gripper conveyor system includes one or more high speed tapes for transporting the signatures to the grippers, whereby the high speed tapes are arranged in parallel to each other downstream of a folding section of a printing press and are driven with substantially the press speed. The arrangement of the rail system relative to the high speed tapes can be such that the grippers are diving into gaps formed between the high speed tapes, when the grippers are advanced along the rail system.

Pursuant to a further embodiment of the invention, the control system controls the movement of the grippers after the grippers have entered the gaps between the high speed tapes in such a way that the speed of each gripper is increased until a trailing edge of a signature is gripped by the gripper.

In the same way, the control system can control the movement of the grippers after the grippers have entered the gaps between the high speed tapes in such a way that the speed of each gripper is reduced until the grippers grip the leading edge of a signature. Moreover, a first gripper can grip the leading edge and a following gripper can grip the trailing edge of a signature, such that the signature is transported by two grippers simultaneously, one holding the leading edge and the other holding the trailing edge of the same signature.

In an exemplary embodiment of the invention, a delivery station to which the signatures are transported by the grippers is located downstream of the high speed tapes; and a first transport section is defined between the high speed tapes and the delivery station. In this embodiment of the invention, the control system decreases the speed of the grippers while the grippers are moving along the first transport section, so that a shingled stream of overlapping signatures is formed when the signatures are passed to a further conveyor belt in the delivery station, running with a reduced speed.

According to yet another embodiment of the invention, a second transport section is defined downstream of the first transport section, whereby in this second transport section the rail system is running upwardly and the grippers are moving with a reduced speed and are spaced in close distances to each other.

Accordingly, a third transport section can be defined between the end of the second transport section and the high speed tapes, in which third transport section the rail system is downwardly inclined when viewed in the traveling direction of the grippers, so that the grippers can be freely running down the third transport section only driven by their weight, but without applying an additional external driving force.

Pursuant to a further exemplary embodiment of the invention, the linear drive system comprises a variety of electromagnetic coils which are arranged along the rail system, and which are coupled to associated micro-controllers via a digital-to-analog-converter and an electric circuit including a wheatstone bridge, such that the electromagnetic field of each coil, particularly in the transfer section and in the first transport section, can be individually controlled by the control system. The wheatstone bridge can further comprise pairs of transistors electrically coupled to a DC-power supply and the digital-to-analog-converter. The micro-controllers can be coupled and controlled by a master controller.

Pursuant to another exemplary embodiment of the invention, the control system can include a first sensor for sensing the movement of the grippers in the rail system and a second sensor for sensing the movement of the signatures while they are transported along the rail system by the grippers. The second sensor can be preferably located near the high speed tapes and includes a photo detector and an associated light source directing light onto the photo detector, whereby the photo detector and the light source are arranged in such a way that the signatures are transported between the light source and the photo detector. The control system can further include an analog-to-digital converter for converting the signals of the first and/or second sensors into digital signals, which can be supplied to the master controller. The master controller in turn regulates and controls the electromagnetic coils via the micro-controllers for accelerating or decelerating the grippers in the rail system.

The electric linear drive system can be based on the principle of any type of known electric linear drive system including, for example, a synchronous drive system or an asynchronous drive system.

According to a further exemplary embodiment of the invention, the grippers can be carrying magnets or can at least partially be formed of magnetic material and can be part of a regenerative braking system for regenerating the kinetic energy of the grippers when decelerating the grippers.

BRIEF DESCRIPTION OF THE DRAWINGS

Other objects, characteristics and advantages of the present invention will become apparent to those skilled in the art in view of the description and accompanying drawings, in which.

DETAILED DESCRIPTION OF THE PREFERRED EMBODIMENT

Figure 1:
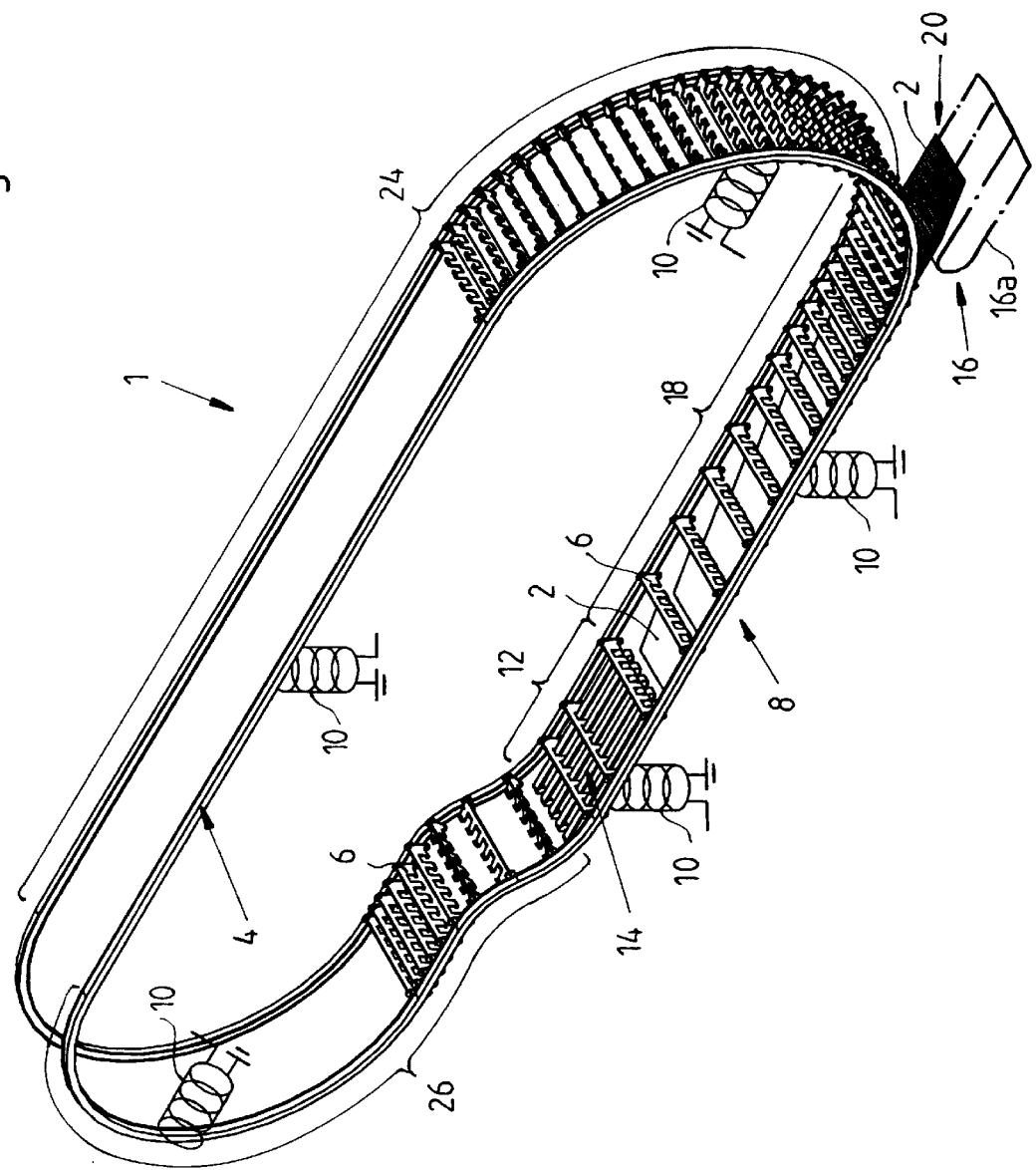
FIG. 1 is a schematic overview of a conveyor system according to an exemplary embodiment of the present invention.

As shown in FIG. 1 a gripper conveyor system 1 for transporting and handling a stream of signatures 2 which have been printed in a not shown printing press, such as a web-fed rotary printing press, and which have been cut and folded in a not shown folding apparatus, comprises a rail system 4 for guiding a plurality of grippers 6. The grippers 6 are independently driven in the rail system 4 by means of a conventional electric linear drive system 8 which is schematically indicated by coils 10.

In a transfer section 12 of the rail system 4, the grippers 6 take over the signatures 2 from a set of high speed tapes 14 which transport the signatures, for example, from the upstream folder section of a printing press to the transfer section 12. As it can be seen from FIG. 1, a delivery station 16 to which the signatures 2 are transported by the grippers 6 is located downstream of the high speed tapes 14, and a first transport 18 section is defined between the high speed tapes 14 and the delivery station 16. The delivery station 16 can be a conventional prior art transport tape or belt 16a, as it is schematically indicated in dotted lines in FIG. 1. The further transport tape 16a can be driven with a speed that is considerably lower than the speed of the high speed tapes 14, so that the signatures 2 are decelerated on the first transport section 18 and form a shingled stream 20 of overlapping signatures after they have been passed over onto the further transport tape 16a.

In this embodiment of the invention, the conveyor system 1 can be configured for decelerating the signatures 2 exiting the high speed tapes 14, in order to arrange them in a shingled formation on the further transport tape 16a. In the same way, the gripper conveyor system 1 of the present invention can also be configured for directly transporting the signatures 2 to a further subsequent mailroom section, such as a not shown collator, slacker, sorter, bindery or the like and is not limited to the described embodiments or the embodiments which are shown in the drawings.

Figure 2:
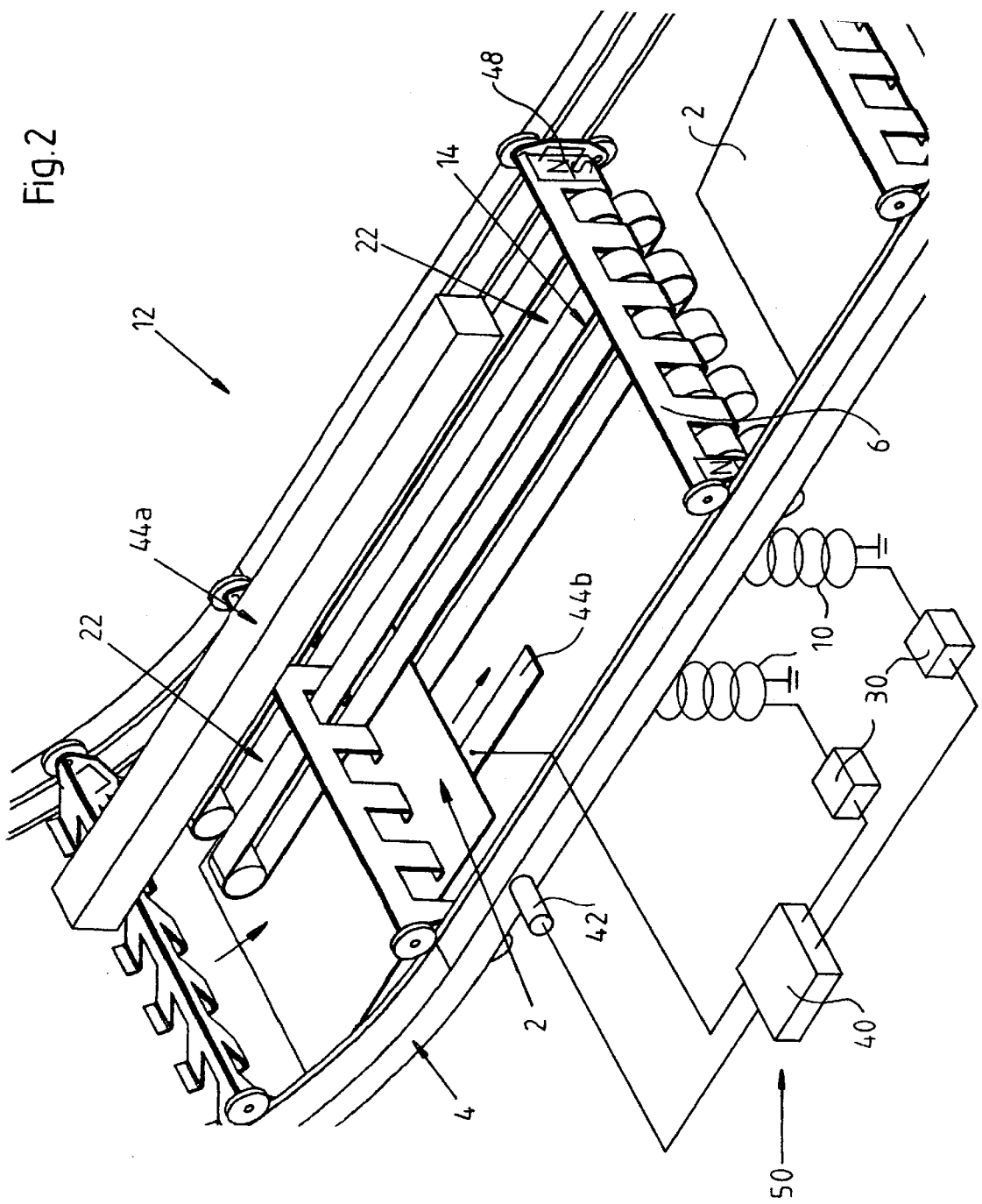
FIG. 2 is a more detailed view of the transfer section of the conveyor system according to an exemplary embodiment of the present invention, in which the signatures are passed over from the high speed tapes to the grippers.

As it can be seen in detail from FIG. 2, the high speed tapes 14 can be arranged in parallel to each other, thereby defining gaps or spaces 22 between two adjacent tapes 14. In the transfer section 12, the rail system 4 is formed and arranged relative to the high speed tapes 14 in such a way, that the grippers 6 are driving into the gaps or spaces 22 between adjacent tapes 14 when the grippers 6 are advanced along the transfer section 12 of the rail system 4. After the grippers 6 have entered the gaps 22, the speed of each gripper 6 is reduced by a control system 50 which will be described in more detail herein below, until the leading edge of the signature 2 can be gripped by the gripper 6. The gripper 6 is then activated, for example, by a known activating mechanism, such as a shaft and a cam follower, an electro magnet or another known prior art actuator (not shown) and grips the leading edge of the signature 2.

In the same way, according to another further embodiment of the invention, the grippers 6 can have a different orientation with respect to their traveling direction and grip the signatures at their trailing edges. In this embodiment, the speed of each gripper 6 is increased by the control system 50, after the grippers 6 have entered the gaps 22, until the trailing edge of the signature 2 can be gripped by activating the gripper 2 in the way described before.

Figure 5:
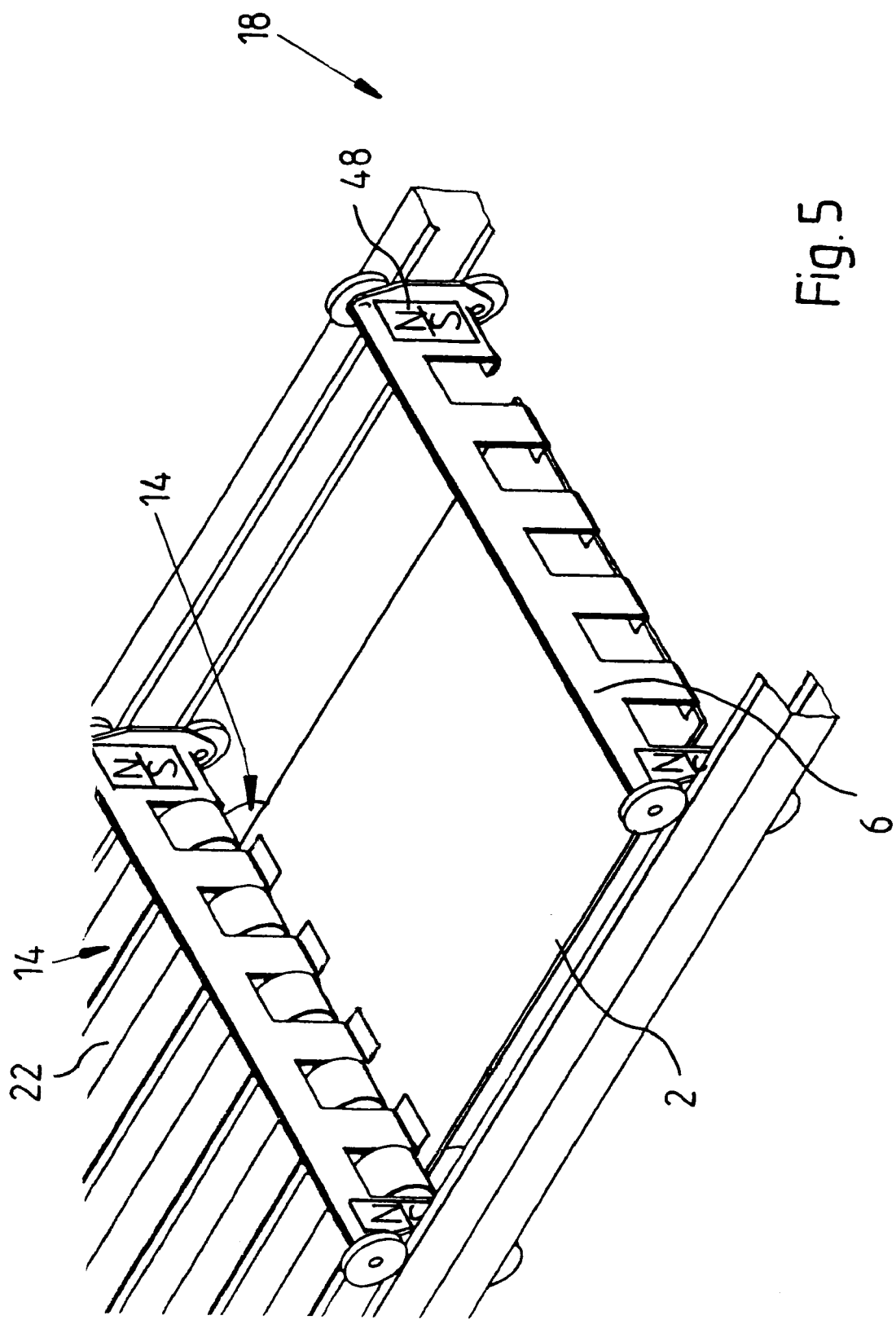
FIG. 5 shows an exemplary embodiment of the present invention wherein grippers grip both the leading and trailing edges of a signature.

Accordingly, a first gripper 6 can grip the leading edge of a signature 2 and a following subsequent gripper 6 can grip the trailing edge of the same signature 2, so that the signature can be transported by two grippers simultaneously, one holding the leading edge and the other one holding the trailing edge of the same signature 2 as shown in FIG. 5.

After a gripper 6 has gripped the leading edge of the signature 2, the control system 50 controls the movement of the gripper 6 in the transfer section 12 of the rail system 4 in such a way that the gripper 6 moves with substantially the same speed as the high speed tapes 14, until the signature 2 has entirely been released from the high speed tapes 14.

Figure 3:
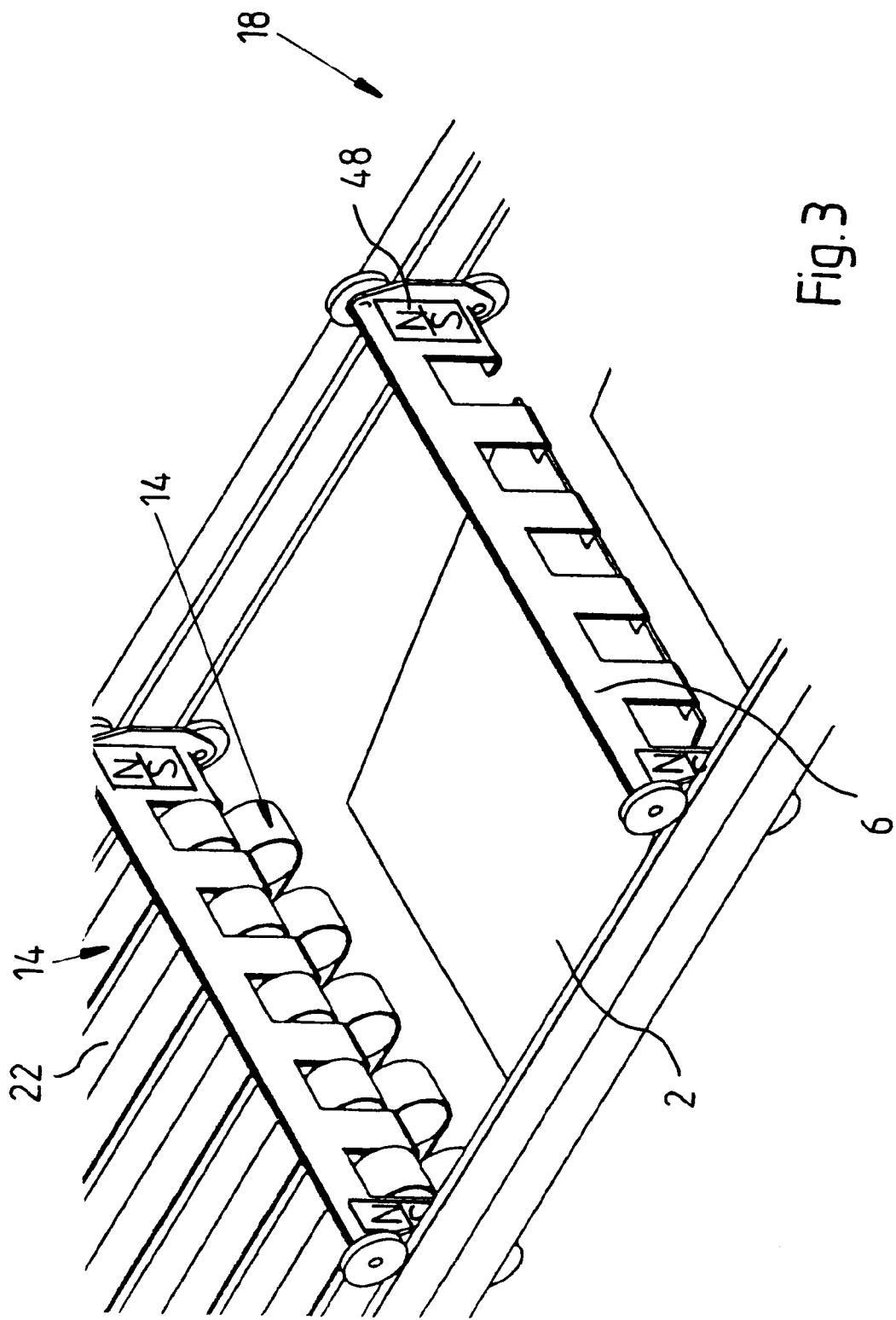
FIG. 3 is a more detailed view of the first transport section of the conveyor system according to an exemplary embodiment of the present invention, in which the grippers carrying the signatures are decelerated.

When the grippers enter the first transport section 18, the grippers 6 can be decelerated by the control system 50, as it is indicated by the decreasing distances between two subsequent grippers 6 in FIGS. 1 and 3.

After the grippers 6 have dropped the signatures 2 or have passed the signatures over to a further transport tape 16a at the delivery station 16, they are entering a second transport section 24 located downstream of the delivery station 16, when viewed in the traveling direction of the grippers 6. In the second transport section 24, the rail system 4 is running substantially upwardly and the grippers 6 are moving with a reduced speed and can be spaced in close distances or even in contact to each other. Accordingly, there may be provided a further auxiliary drive system in the second transport section 24, such as a known chain drive or the like, which engages the grippers 6 and moves them upwardly along the rail system 4 in the second transport section 24. In this embodiment of the invention, the electromagnetic coils 10 of the electric linear drive system 8 can be omitted or at least partially be replaced by a cheaper auxiliary drive system.

As it can further be seen from FIG. 1, a third transport section 26 can be defined between the end of the second transport section 24 and the transfer section 12. In the third transport section 26, the rail system 4 is inclined substantially downwardly when viewed in the traveling direction of the grippers 6, so that the grippers 6 are only driven by gravity without applying any further external driving forces. Accordingly, it is not necessary to arrange coils 10 along the rail system 4 in the third transport section 26 for advancing the grippers 6 along the third transport section 26, although the use of additional electromagnetic coils 10 can be advantageous.

In an exemplary embodiment of the invention, the linear drive system 8 comprises a variety of electromagnetic coils 10 which is, for reasons of clarity, schematically represented by only one electromagnetic coil 10 in each of the respective sections 12, 18, 24. As it is shown in detail in FIG. 4, each of the coils 10 is coupled to an associated micro-controller 30 via a digital-to-analog-converter 32 and an electric circuit 34 including a wheatstone bridge. The wheatstone bridge can further comprise pairs of transistors which are electrically coupled to a DC-power supply 36 and to the respective digital-to-analog-converter 32.

Figure 4:
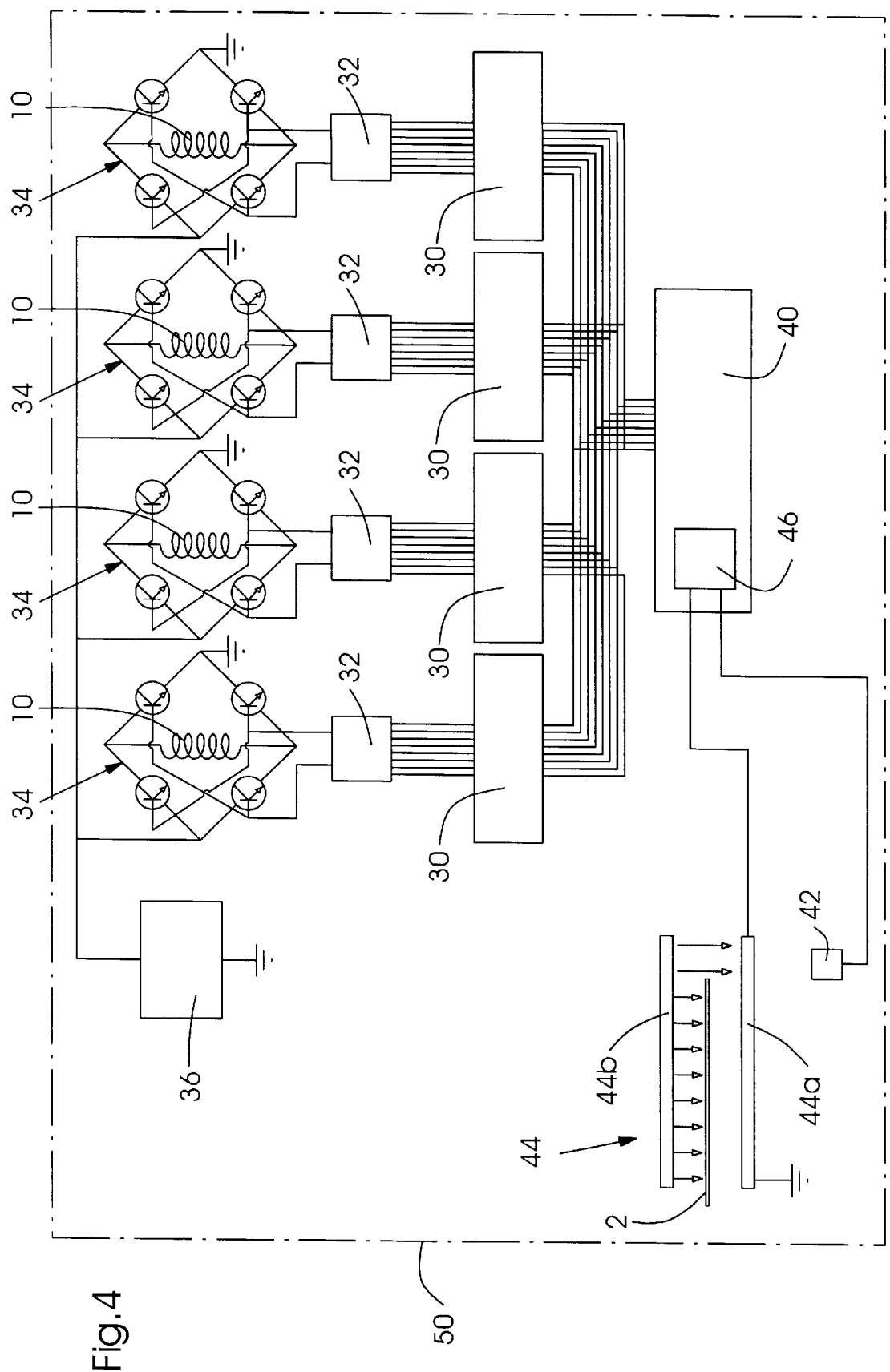
FIG. 4 is schematic diagram of the electric circuit of the control system according to an exemplary embodiment of the present invention for controlling the movement of the grippers in the rail system.

Each of the micro-controllers 30 can be coupled to a master controller 40, via a parallel data interface and a parallel bus, as indicated in FIG. 4. The master controller 40 can receive gripper position signals from a first sensor 42, and/or may receive signature position signals from a second sensor 44. The first and/or second sensors 42 and 44 may be connected to the master controller 40 via a known analog-to-digital-converter 46 which converts the analogous signals of the sensors 42, 44 into digital signals, for further processing by the master controller 40.

The first sensor 42 can be a known inductive or proximity sensor (or sensors) which can be directly mounted to the rail system 4, as it is schematically indicated in FIG. 2.

The second sensor 44 however can comprise a photo detector 44a and an associated light source 44b which directs light onto the photo detector 44a. As it can be seen from FIG. 2, the photo detector 44a and the light source 44b are arranged in such a way that the signatures 2 are transported between the light source and the photo detector. In this embodiment of the present invention, the amplitude of the signal outputted by the photo detector 44a is indicative of the position of the leading edge of a signature relative to the detector 44a, and the speed of a signature 2 is accordingly proportional to the first deviation of the signal or in other words the increase or decrease of the signal over time.

In dependence of the signals of the first and/or second sensors 42, 44, the master controller 40 generates control signals which are supplied to the respective micro-controller 30, which in turn controls and regulates the polarity and/or amplitude and/or AC phase angle of the voltage or the electric current supplied to each electromagnetic coil 10 in dependence of the position and/or speed of the signatures 2 and the grippers 6.

The usage of a central master controller 40 and two or more independent micro-controllers 30 coupled to each coil 10 allows each gripper 6 to receive a variable acceleration force to properly register the gripper when gripping the leading and/or trailing edge of a signature 2. Furthermore, the use of independent microcontrollers 30 also speeds up the response time of the control system 50 including the coils 10, the micro-controllers 30, the digital-to-analog-converters 32, the electric circuits 34, the master controller 40 and the first and/or second sensors 42 and 44, by freeing the master controller 40 to only perform system management tasks and external data acquisition tasks.

The electric linear drive system 8 of the present invention can be any type of a conventional prior art electric linear drive system, such as a synchronous drive system or an asynchronous drive system.

According to a further exemplary embodiment of the invention, the grippers 6 can comprise magnets 48 or can at least partially be formed of magnetic material. Moreover, in this embodiment of the invention, a regenerative braking system for regenerating the kinetic energy of the grippers when decelerating the grippers can be provided which is based on the known principle of an inductive current and an associated braking force induced in the electromagnetic coils 10, when moving the grippers 6 with the magnets 48 past the coils 10.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A web-fed printing press including a folding section and a mailroom conveyor system downstream of the folding section for transporting and handling a stream of signatures in a mailroom, the conveyor system comprising:

a plurality of grippers;

a rail system for guiding said plurality of grippers;

an electric linear drive system individually driving said grippers in said rail system;

a control system connected to said electric linear drive system for independently controlling the movement of each of said plurality of grippers in said rail system; and tapes for transporting the signatures to said grippers:

wherein the arrangement of the rail system relative to the tapes is such that said grippers dive into gaps formed between said tapes, when said grippers are advanced along said rail system.

2. Apparatus according to claim 1, wherein the control system controls the movement of said grippers after said grippers have entered said gaps between said tapes such that the speed of each gripper is increased until a trailing edge of a signature is gripped by said gripper.

3. Apparatus according to claim 2, wherein said control system decreases the speed of said grippers after said grippers have gripped the signatures at their trailing edge.

4. Apparatus according to claim 1, wherein the control system controls the movement of said grippers after said grippers have entered said gaps between said tapes such that the speed of each gripper is reduced until a leading edge of a signature is gripped by said gripper.

5. Apparatus according to claim 4, wherein the speed of said grippers is decreased below the speed of said transport tapes after said grippers have gripped the signatures at their leading edge.

6. Apparatus according to claim 1, wherein a delivery station to which the signatures are transported by said grippers is located downstream of said tapes, and wherein a first transport section is defined between said tapes and said delivery station.

7. Apparatus according to claim 6, wherein said control system decreases the speed of said grippers while said grippers are advanced along said first transport section.

8. Apparatus according to claim 7, wherein a second transport section is defined downstream of said first transport section, said rail system in said second transport section being arranged such that said grippers are moved upwardly when advancing said grippers along said second transport section.

9. Apparatus according to claim 8, wherein a third transport section is defined between said second transport section and said tapes, said rail system in said third transport section being downwardly inclined when viewed in the traveling direction of the grippers such that the grippers are advanced along said third transport section by gravity.

10. Apparatus of claim 1, wherein said linear drive system comprises a variety of electromagnetic coils, said coils being arranged along said rail system and being individually controllable by said control system.

11. Apparatus according to claim 10, wherein said grippers include magnets interacting with the electromagnetic field generated by said electromagnetic coils for driving the grippers.

12. Apparatus according to claim 10, wherein said control system includes a variety of micro-controllers, each micro-controller being associated with one of said electromagnetic coils and being coupled to a master controller for controlling said variety of micro-controllers.

13. Apparatus according to claim 12, wherein each of said micro-controllers is coupled to said inductive coils via a digital-to-analog-converter and an electric circuit including a wheatstone bridge.

14. Apparatus according to claim 13, wherein said wheatstone bridge comprises pairs of transistors electrically coupled to a DC-power supply and said digital-to-analog-converter.

15. Apparatus according to claim 1, wherein said control system includes a first sensor for sensing the movement of said grippers in said rail system.

16. Apparatus according to claim 1, wherein said control system includes a second sensor for sensing the movement of said signatures.

17. Apparatus according to claim 16, wherein said control system generates a signature position signal from an output of said second sensor.

18. Apparatus according to claim 17, wherein said control system generates a speed signal indicative of the speed of a signature from an output of said second sensor.

19. Apparatus according to claim 18, wherein said second sensor includes a photo detector and an associated light source directing light onto said photo detector, the arrangement of said photo detector and said light source being such that the signatures are transported between said light source and said photo detector.

20. Apparatus according to claims 19, wherein said control system includes an analog-to-digital converter for converting signals provided by said second sensor into digital signals.

21. Apparatus according to claim 1, wherein the electric linear drive system is a synchronous drive system.

22. Apparatus according to claim 1, wherein the electric linear drive system is an asynchronous drive system.

23. Apparatus according to claim 11, wherein the control system includes a regenerative braking system for regenerating electric energy induced in said variety of coils by said magnets when decelerating said grippers.

* * * * *